March 1, 1927. O. SMITH 1,619,491
MEASURE OF TENSION DIFFERENTIAL
Filed July 1, 1925
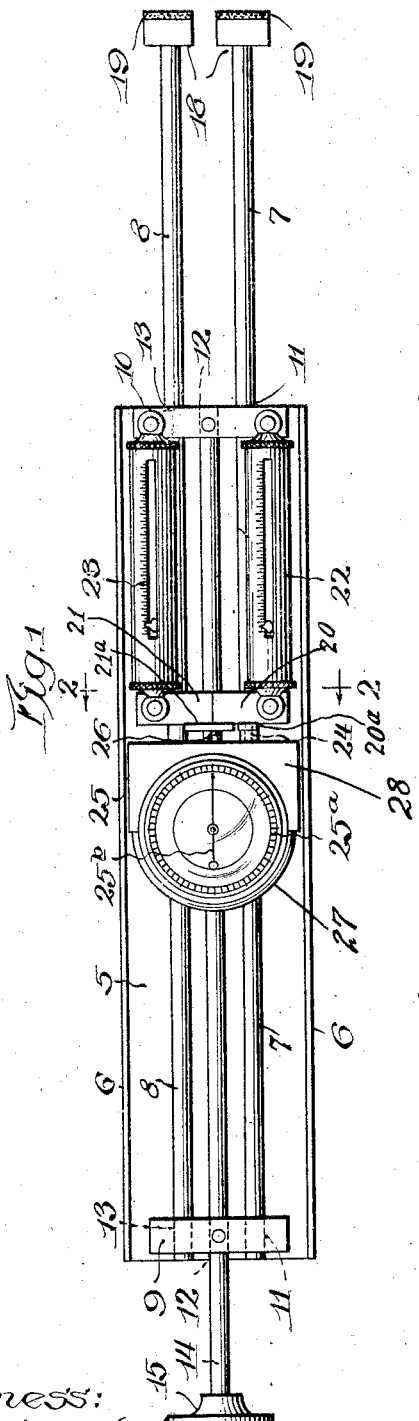
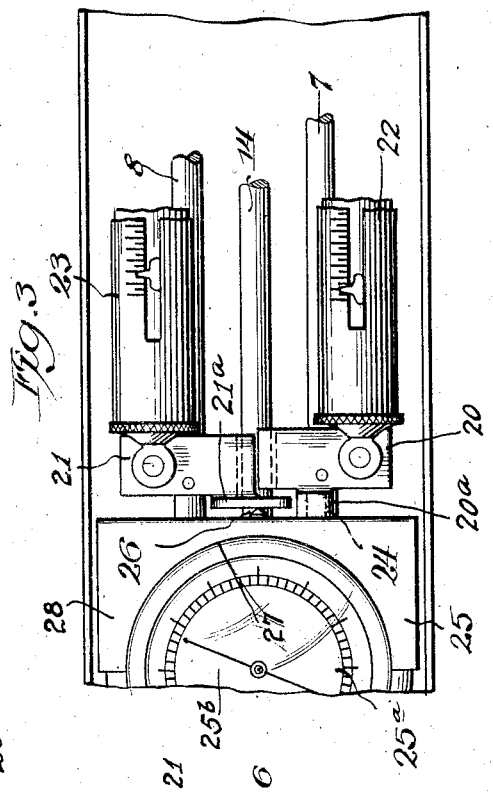
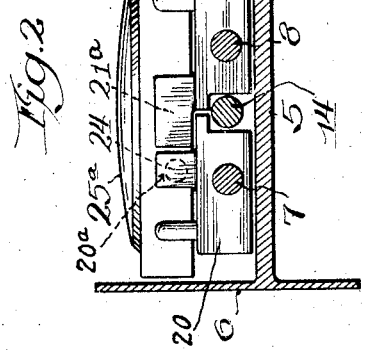

Patented Mar. 1, 1927.

1,619,491

UNITED STATES PATENT OFFICE.

OAKLEY SMITH, OF CHICAGO, ILLINOIS.

MEASURE OF TENSION DIFFERENTIAL.

Application filed July 1, 1925. Serial No. 40,776.

My present invention relates to the provision of an instrument for measuring the differential in tension of ligamentous and other anatomical tissue under varying but known stress or effort, that is to say, by measuring the difference of different tissue groups to resist known pressures data can be obtained by which the physical condition of the respective tissue groups can be known, and also, differences of resistance of particular tissue groups permit of a localization of any abnormality which may be present.

My instrument may and should be reversed in its application, that is, if a difference of resistance to stress is indicated in one position the plungers should be turned about to ascertain if a like differential will be indicated, thereby checking up the action of the tissue and the accuracy of manipulation. Also, as will hereinafter be noted, I have provided separate instrumentalities showing the amount of stress exerted by the respective plungers. From the action of these instrumentalities in themselves a differential of resistance could be calculated, but I have also provided other and separate means for showing directly any differential which may exist. Again, by providing separate means for indicating the stress upon each plunger it is possible to vary the amount of pressure exerted by the respective plungers, thereby increasing the field of application of the instrument.

I attain the production of an instrument having the above-mentioned capabilities and features by means of the structure illustrated in the accompanying drawing, in which—

Fig. 1 is a view of the front of the instrument;

Fig. 2 is a section on line 2—2 of Fig. 1; and,

Fig. 3 is a fragmentary enlarged detail of the differential indicating arrangements.

I have employed like reference characters to indicate similar parts in the several figures.

The frame of the instrument is an elongated element of H section, upon one side of the web, 5, of which the instrumentalities are mounted, the flanges, 6, being so proportioned as to extend equally in opposite directions from the plane of the plungers, 7 and 8. Upon the instrument side of the web, 5, between and at opposite ends of the flanges, 6, are secured blocks, 9 and 10, in each of which blocks are three aligning bores, 11, 12 and 13. Fitting and fixedly secured in the central bores, 12, is a rod, 14, which extends beyond the block, 9, at one end of the instrument and upon this extended end is provided a knob, or handle, 15, by means of which the instrument can be pressed in the desired direction with the desired amount of force. Extending through and between the aligning apertures, or bores, 11 and 13, are the plunger rods, 7 and 8. These plunger rods move longitudinally in their respective bores and upon their ends opposite the location of the knob, 15, are provided with feet, 18, which may be shod with leather, 19, or any other desired and suitable material to lessen the liability of the slipping of these respective feet. Blocks, 20 and 21, are fixedly secured to the respective plunger rods, 7 and 8, intermediate the end blocks, 9 and 10, and these intermediate blocks, 20 and 21, are respectively secured to the end block, 10, by means of any suitable stress indicating means, such, for instance, as the spring balances, or scales, 22 and 23.

To a lateral embossment 20ª of the intermediate block, 20, is secured the fixed point, 24, of any suitable spring actuated micrometer device, 25, such, for instance, as a lens measure having, preferably, a scale, 25ª, and an indicator hand, 25ᵇ, co-operating with said scale. The movable member, 26, of the micrometer device 25, engages with the lateral extension 21ª of movable block, 21.

The spring actuated micrometer device, or lens measure, referred to above, is exemplified by the ordinary lens measure used by dealers in spectacles and eyeglasses for a considerable time. This device consists usually of a disked shaped casing 27 having a rectangular extension 28 at one side thereof. A movable pin 26, heretofore referred to, extends through the center of the extension 28 and radially with the disked shaped casing. This movable pin 26 is pressed outwardly to the full extent of its movement by a spring and the movable pin 26 is associated with the pivot carrying the indicator arm 25ᵇ through the instrumentality of a series of compound levers whereby the slight movement of the pin 26 causes a relatively large movement of the indicator arm or pointer 25ᵇ. In the usual lens measure two fixed pins project from the extension 28 on either side of the central pin and in calibrating the dial 25ª, over which the indicator arm or pointer rotates, a zero mark is placed at the point occupied by the indicator arm or pointer when the movable pin 26 is forced back into the plane occupied by the ends of the two fixed pins.

It will be seen from the foregoing that when the movable pin is projected from the mechanism beyond the plane of the ends of the two fixed pins, the indicator arm will be at some position upon one side of the zero mark on the scale, and when the movable pin is forced further in than the plane of the ends of the two fixed pins, the indicator arm will be at some point upon the opposite side of the zero mark upon the scale.

In adapting this lens measure to the present instrument but one fixed pin is required. This fixed pin 24 is secured to block 20 by boring the lateral and upwardly extending embossment $20^a$ thereof and forcing pin 24 into said bore to such a distance that when the main faces of block 20 carried by rod 7 and block 21 carried by rod 8 are aligning the indicator arm or pointer $25^b$ will be above the zero mark upon the disc or scale, so that if rod 7 is forced back further than rod 8 the indicator will swing to one side of the zero mark, and if rod 8 is forced back further than rod 7 the indicator arm will swing to the opposite side of the zero mark.

It will be seen from the foregoing description, taken in connection with the drawing, that when the instrument is placed with the feet, 18, upon the tissue groups, the action whereof is to be examined and compared, and pressure is applied through the knob, or handle, 15, the amount of stress exerted upon each tissue group will be indicated by the scales, 22 and 23, and, also, at the same time, any differences of resistance to the action of the plungers will be directly shown by the micrometer indicator hand, $25^b$.

Having described my invention, what I claim is new, and desire to secure by Letters Patent, is—

1. An instrument for measuring differential of resistance to applied pressure, comprising a frame to which force is applied, a plurality of independently movable plungers carried by said frame, separate means extending between the frame and the respective plungers for indicating the pressure applied to the subject matter under test through the several plungers, and independent means for showing the differential between the action of the several plungers.

2. An instrument for measuring differential of resistance to applied pressure, comprising a frame a plurality of independently movable plungers mounted in said frame, means for yieldingly maintaining said plungers in a uniform relation to said frame and independent means for showing the differential between the action of the several plungers.

3. An instrument for measuring differential of resistance to applied pressure comprising a body, a plurality of plungers for engagement with the subject matter under test, said plungers extending from said body and having independent reciprocable relation to said body, means for maintaining said respective plungers yieldingly in predetermined relation to said body, an indicator carried by one of said plungers and means carried by the other of said plungers extending into co-active relation with said indicator for showing relative movement between said plungers.

4. An instrument for measuring differential of resistance to applied pressure comprising a body, a plurality of plungers for engagement with the subject matter under test, said plungers extending from said body and having independent reciprocable relation to said body, independent means for maintaining said respective plungers yieldingly in predetermined relation to said body, an indicator carried by one of said plungers and means carried by the other of said plungers extending into co-active relation with said indicator for showing relative movement between said plungers.

5. An instrument for measuring differential of resistance to applied pressure comprising a body, a plurality of plungers for engagement with the subject matter under test, said plungers extending from said body and having independent reciprocable relation to said body, spring scale devices for maintaining said respective plungers yieldingly in predetermined relation to said body, an indicator carried by one of said plungers and means carried by the other of said plungers extending into co-active relation with said indicator for showing relative movement between said plungers.

OAKLEY SMITH.